United States Patent [19]
Kakihara

[11] Patent Number: 5,956,749
[45] Date of Patent: Sep. 21, 1999

[54] DATA BACK-UP SYSTEM USING NONVOLATILE READ/WRITE MEMORY

[75] Inventor: Koji Kakihara, Tokyo, Japan

[73] Assignee: NEC Corporation, Tokyo, Japan

[21] Appl. No.: 08/865,659

[22] Filed: May 30, 1997

[30] Foreign Application Priority Data

May 30, 1996 [JP] Japan ................................. 8-158836

[51] Int. Cl.⁶ ............................................... G06F 12/16
[52] U.S. Cl. ............................................ 711/162; 711/103
[58] Field of Search .................................. 711/103, 161, 711/162, 154

[56] References Cited

U.S. PATENT DOCUMENTS 5,465,338  11/1995  Clay ......................................... 395/310

FOREIGN PATENT DOCUMENTS

| 5798307 | 12/1983 | Japan . |
| 64-27096 | 1/1989 | Japan . |
| 3-214384 | 9/1991 | Japan . |
| 5-265842 | 10/1993 | Japan . |
| 7-78485 | 3/1995 | Japan . |
| 7-234822 | 9/1995 | Japan . |

*Primary Examiner*—Eddie P. Chan
*Assistant Examiner*—Kevin L. Ellis
*Attorney, Agent, or Firm*—Foley & Lardner

[57] ABSTRACT

A data back-up system of the present invention is applicable to a portable data terminal and includes an exclusive read/write controller for exclusively controlling the writing and reading of data out of a first nonvolatile memory. Only the control over the entire data terminal is assigned to a main controller. A volatile memory serves as a work area while a second nonvolatile memory stores system software including an operating system. The exclusive read/write controller makes it needless for the main controller to wait until all the necessary data have been written to the first nonvolatile memory. Moreover, the system implements rapid and reliable data back-up without resorting to a battery.

7 Claims, 3 Drawing Sheets

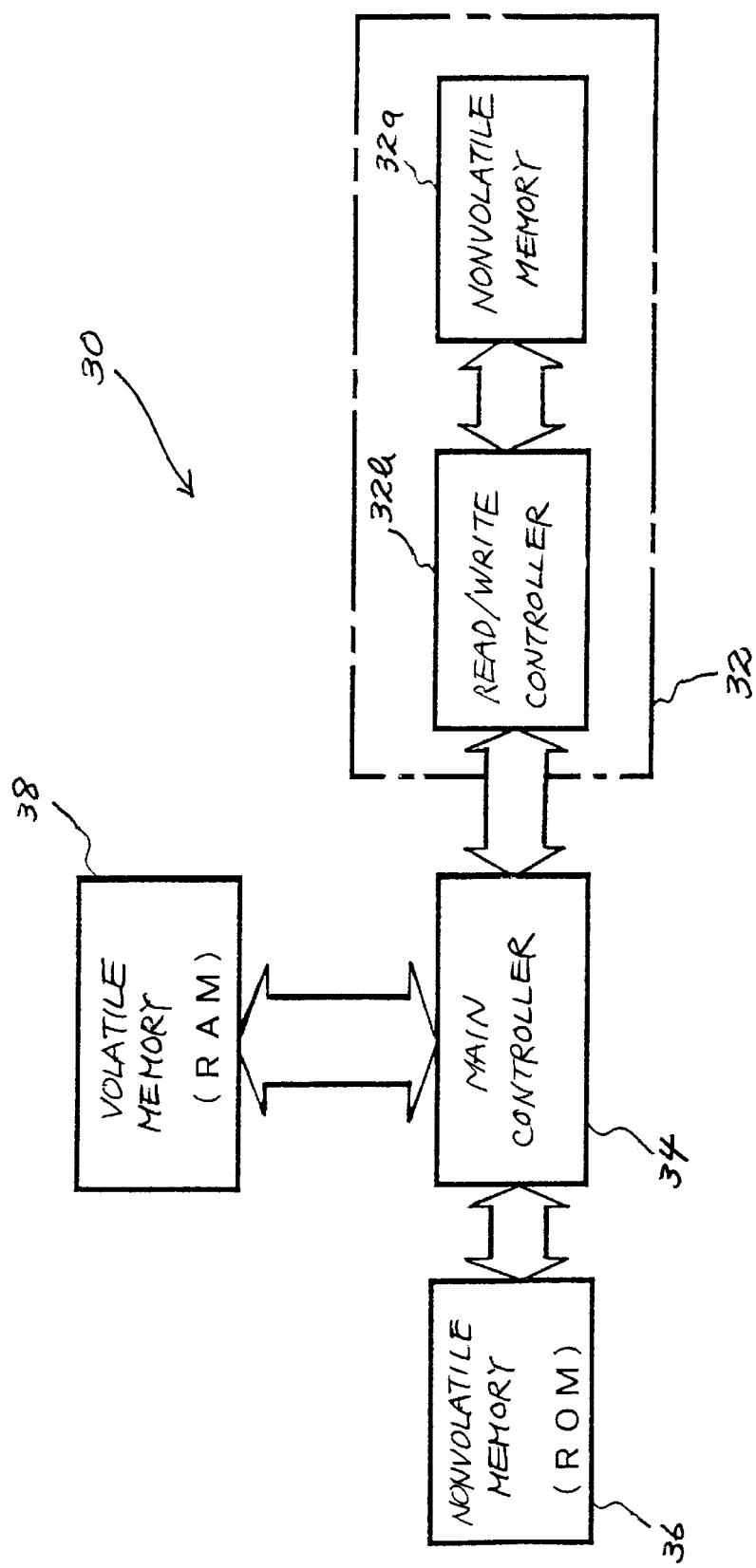

DATA BACK-UP SYSTEM USING NONVOLATILE READ/WRITE MEMORY

BACKGROUND OF THE INVENTION

The present invention relates to a data back-up system using a nonvolatile READ/WRITE memory and, more particularly, to a data back-up system advantageously applicable to a handy terminal or a portable data terminal and capable of preventing data stored in the terminal from being lost.

In a handy terminal or a portable data terminal, a data back-up system for the protection of stored data has customarily been implemented by a volatile memory (RAM (Random Access Memory)) backed up by a battery or a nonvolatile memory (FROM (Flash Read Only Memory)) not needing battery back-up.

However, the problem with the conventional data back-up system using a volatile memory backed up by a battery is that the output of the battery decreases due to aging and low temperature, and the battery is apt to bodily come off due to a shock or impact or defective mounting. Any defect of the battery supporting the back-up system directly translates into defective back-up and causes data stored in the terminal to be lost. The data back-up system using a nonvolatile memory has a drawback that a long period of time is necessary for data to be updated (deletion and writing) even if the system is supported by a flash system or similar special software. Another problem with the nonvolatile memory type system is that the processing of the special software occupies a substantial part of a controller playing the role of a CPU (Central Processing Unit). This prevents another processing from being executed until all the necessary data have been written to the nonvolatile memory.

SUMMARY OF THE INVENTION

It is therefore an object of the present invention to provide a data back-up system using a nonvolatile read/write memory, and capable of backing up data by insuring rapid and stable updating.

A data back-up system for backing up data by using a nonvolatile read/write memory of the present invention includes a nonvolatile memory unit made up of a first nonvolatile memory for storing data to be sequentially updated and including a spare area having a preselected capacity, and an exclusive read/write controller for exclusively controlling writing and reading of data out of the first nonvolatile memory while being supplied with the data from outside of the nonvolatile memory unit. A main controller feeds necessary data to the read/write controller and causes it to write and read the data out of the first nonvolatile memory, and controls the entire data terminal. A second nonvolatile memory has a ROM configuration and stores system software including an operating system and firmware necessary for the main controller to control the entire data terminal. A volatile memory has a RAM configuration and implements a work area for the entire data terminal.

BRIEF DESCRIPTION OF THE INVENTION

The above and other objects, features and advantages of the present invention will become apparent from the following detailed description taken with the accompanying drawings in which:

FIG. 3 is a block diagram schematically showing a data back-up system embodying the present invention.

DESCRIPTION OF THE PREFERRED EMBODIMENT

Figure 1:
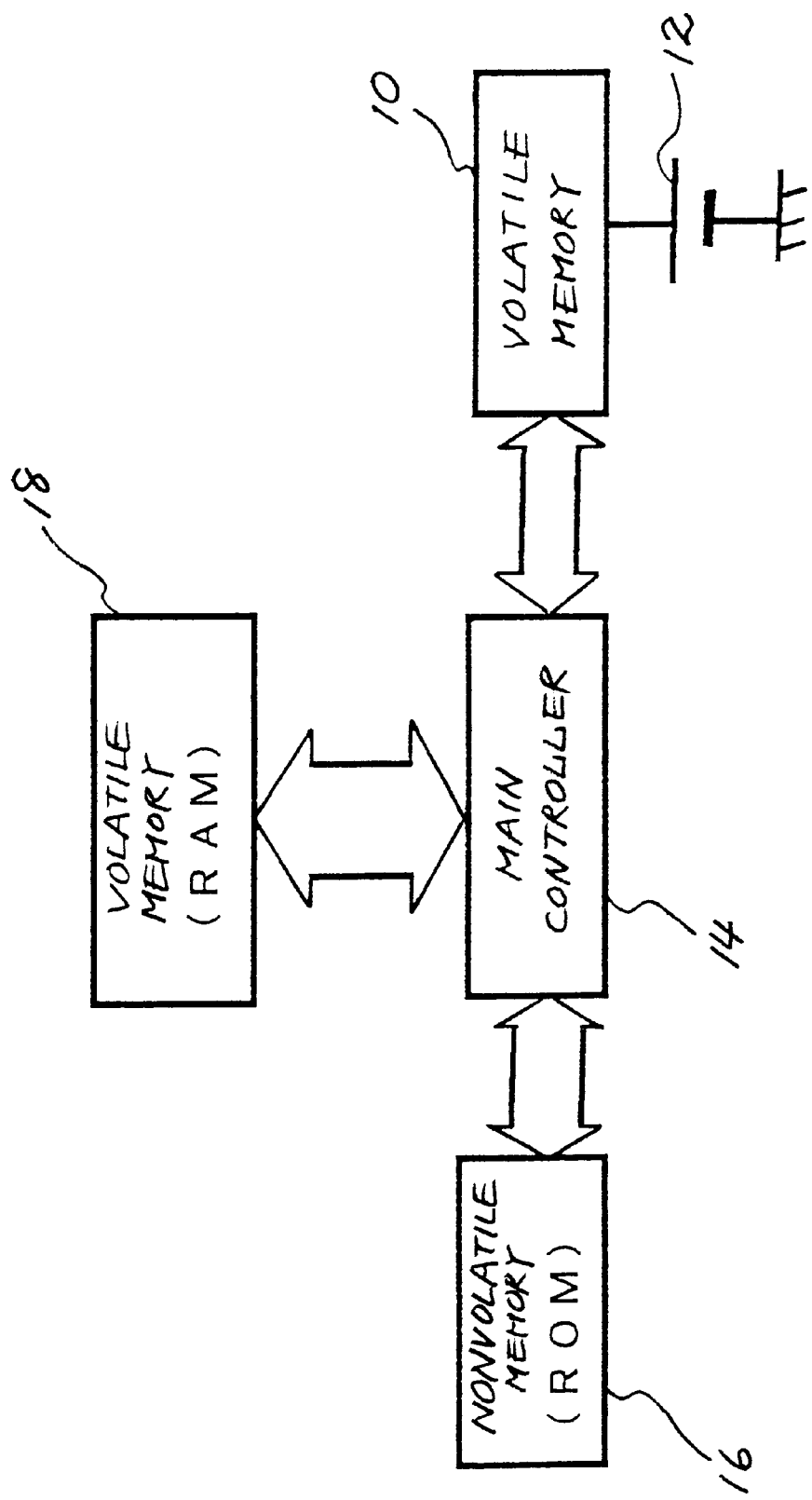
FIG. 1 is a block diagram schematically showing a conventional data back-up system using a volatile memory backed up by a battery.

To better understand the present invention, brief reference will be made to a conventional data back-up system of the type using a volatile memory, shown in FIG. 1. As shown, the system includes an SRAM (Static RAM), DRAM (Dynamic RAM) or similar volatile memory 10 for storing data. The volatile memory 10 is backed up by a battery 12. Data are written and read out of the memory 10 under the control of a main controller 14 which plays the role of a CPU. A nonvolatile memory (ROM) 16 stores an operating system (OS) or system software, firmware, and other programs. A volatile memory (RAM) 18 is used as a work area. The entire system operates under the control of the main controller 14. The volatile memories 10 and 18 are sometimes implemented as a single memory.

The problem with the above back-up system is that data to be backed up are lost when the output of the battery decreases due to aging or low temperature or when the battery comes off due to a shock or impact, as stated earlier.

Figure 2:
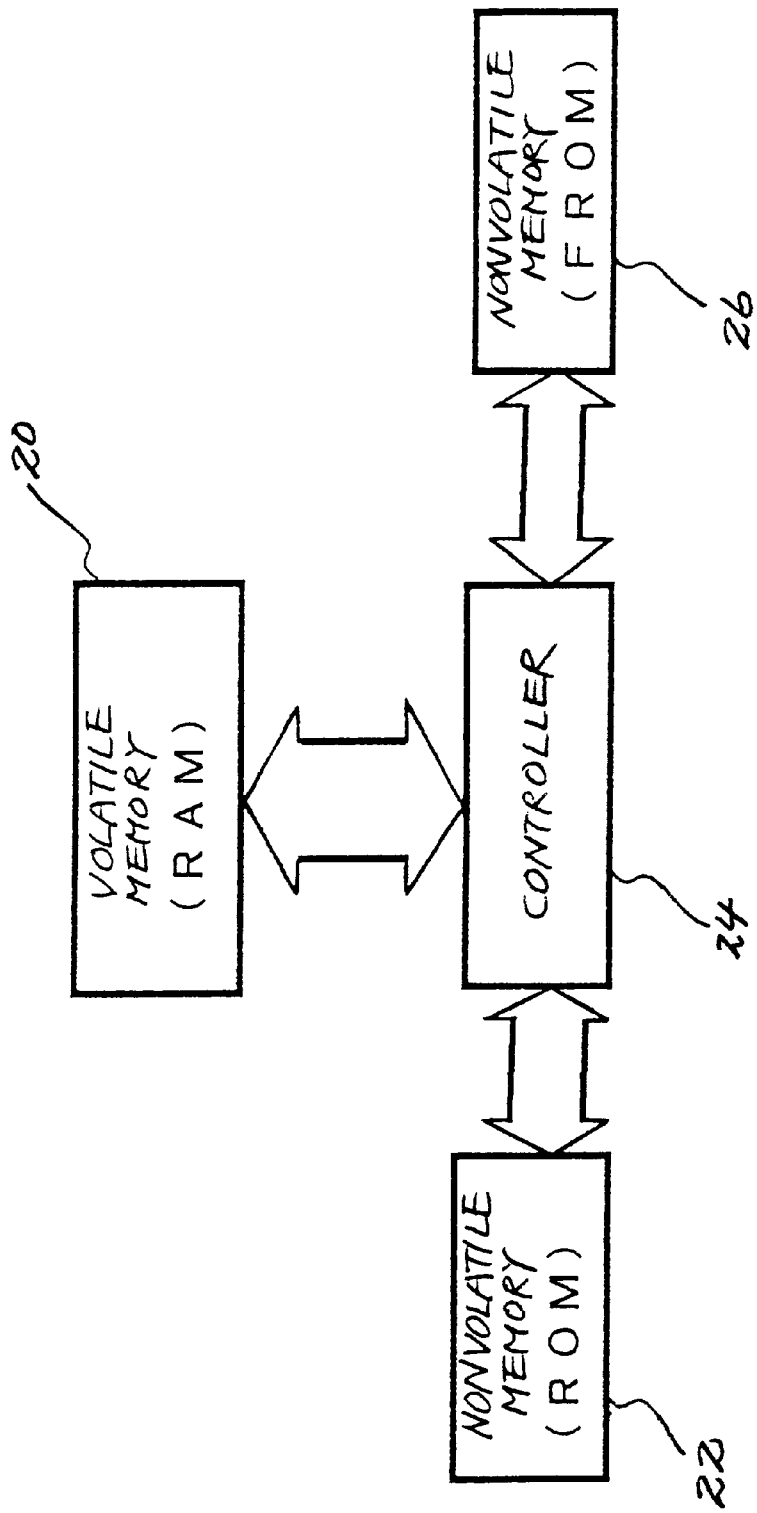
FIG. 2 is a block diagram schematically showing another conventional data back-up system which uses a nonvolatile memory.

FIG. 2 shows another conventional data back-up system which uses a nonvolatile memory. As shown, the system includes a volatile memory (RAM) 20 to be used as a work area. A nonvolatile memory (ROM) 22 stores an OS, firmware and other system software. A controller 24 plays the role of a CPU. A nonvolatile memory (FROM) 26 is also used as a work area. Data are written and read out of the nonvolatile memory 26. This type of system has a drawback that without the support of special software, the nonvolatile memory 26 cannot be rewritten at each time of data updating; that is, deletion and writing are effected in a batch each, increasing the writing time. In light of this, the system is constructed such that only the data to be read out, as distinguished from data to be updated, can be written to the nonvolatile memory 26. The nonvolatile memories 22 and 26 are sometimes implemented as a single memory.

To solve the above problem that data to be updated cannot be written to the nonvolatile memory 26, there has been implemented a system supported by a flash file system which is special software. This kind of system allows data stored in the memory 26 to be updated. However, the updating time is far longer than the updating time available with the volatile memory 10, of FIG. 1, so that the system is not equivalent to, or replaceable with, the system shown in FIG. 1.

Referring to FIG. 3, a data back-up system embodying the present invention will be described. As shown, the system, generally 30, includes a nonvolatile memory unit 32 made up of a first nonvolatile memory 32a and an exclusive read/write controller 32b. The memory unit 32 is capable of writing and reading data rapidly with the nonvolatile memory 32a, as desired. A main controller or CPU 34 controls the entire system including the memory unit 32. A second nonvolatile memory (ROM) 36 stores an OS and firmware necessary for the control over the entire system. A volatile memory (RAM) 38 plays the role of a work area. In the memory unit 32, the read/write controller 32b is exclusively assigned to the first nonvolatile memory 32a in order to control the writing and reading of data out of the memory 32a.

The read/write controller 32b, nonvolatile memory 32 and main controller 34 constitute automatic error correcting means, first write area selecting means, and second write area selecting means. A spare area having a preselected capacity is defined in the nonvolatile memory 32a beforehand.

The operation of the system 30 will be described hereinafter. The nonvolatile memory 32a included in the memory unit 32 stores an application program and data both of which are adapted for a service. Data are written to or read out of the memory 32a under the control of the exclusive read/write controller 32b. Basically, the read/write controller 32b controls the memory 32a alone while receiving necessary data from the main controller 34. Further, the read/write controller 32b has the following three additional functions.

First, the read/write controller 32b serves as the previously mentioned automatic error correcting means which guarantees the identity of data written to the memory 32a and data read out of the memory 32a. Second, the controller 32b plays the role of the first write area selecting means. Specifically, because the service life of the memory 32a is generally limited by the number of times of writing, the first write area selecting means 32b selects adequate locations of the memory 32a in such a manner as to prevent the memory area from being locally deteriorated, i.e., to insure the even deterioration of the entire memory area. Third, the controller 32b serves as the second write area selecting means for determining, based on the number of times of writing taking account of the first write area selecting means, whether or not the life of the memory 32a has expired, and switching the read/write area to the previously mentioned spare area when the life of the memory 32a has expired. This successfully extends the life of the memory 32a.

With the above first, second and third additional functions, the read/write controller 32b enhances the reliability of contents to be executed and extends the life of the memory 32a. The first to third functions, mainly implemented as a program stored in the controller 32b, can be executed at the same time or in a suitable combination.

The main controller 34 loads, among the control programs (OS and firmware) stored in the nonvolatile memory 36, a necessary control program and the service application program stored in the nonvolatile memory 32a on the volatile memory or work area 38, and then executes such programs. The service application program loaded on the memory 38 is updated under the control of the main controller 34 with reference to the service data stored in the memory 32a, as needed. The updated service data are transferred from the main controller 34 to the read/write controller 32b and sequentially written to the nonvolatile memory 32a by the read/write controller 32b.

As stated above, the main controller 34 has only to feed necessary data to the read/write controller 32b. This makes it needless for the main controller 34 to wait until the read/write controller 32b writes all the data in the nonvolatile memory 32a. The system therefore insures stable data back-up while guaranteeing the rapid updating of data stored in the memory 32a.

In summary, in accordance with the present invention, a data back-up system includes an exclusive controller for updating a nonvolatile memory. The exclusive controller eliminates the need for data back-up relying on a battery, and therefore thoroughly obviates the disappearance of data and insures reliability. This is because a nonvolatile read/write memory included in the system does not have to be backed up by a battery. Moreover, the system of the present invention can replace the conventional back-up system using a volatile memory because an exclusive read/write controller is assigned to the nonvolatile memory and makes it needless for a main controller to wait until all the data have been written to the nonvolatile memory.

Various modifications will become possible for those skilled in the art after receiving the teachings of the present disclosure without departing from the scope thereof.

What is claimed is:

1. A data back-up system for backing up data by using a nonvolatile read/write memory, comprising:

a nonvolatile memory unit comprising a first nonvolatile memory for storing data to be sequentially updated and including a spare area having a preselected capacity, and an exclusive read/write controller for exclusively controlling writing and reading of data out of said first nonvolatile memory while being supplied with the data from outside of said nonvolatile memory;

a main controller for feeding data to be backed up to said exclusive read/write controller and causing said exclusive read/write controller to write and read the backed up data out of said first nonvolatile memory, and for controlling an entire data terminal;

a second nonvolatile memory having a ROM configuration, for storing system software including an OS and firmware necessary for said main controller to control the entire data terminal; and a volatile memory having a RAM configuration and implementing a work area for the entire data terminal.

2. A system as claimed in claim 1, wherein said exclusive read/write controller includes automatic error correcting means for guaranteeing identity of the data written to said first nonvolatile memory and the data read out of said first nonvolatile memory.

3. A system as claimed in claim 1, wherein the main controller is capable of running a program stored in the volatile memory at a same time that the exclusive read/write controller is causing the backed-up data to be written into the first nonvolatile memory.

4. A system as claimed in claim 1, wherein said exclusive read/write controller includes first write area selecting means for controlling selection of a write area such that local deterioration of said first nonvolatile memory is reduced.

5. A system as claimed in claim 4, wherein said exclusive read/write controller includes second write area selecting means for writing and reading, when a life of said first nonvolatile memory dependent on a number of times of writing expires, the data out of said spare area of said first nonvolatile memory.

6. A system as claimed in claim 2, wherein said exclusive read/write controller includes first write area selecting means for controlling selection of a write area such that local deterioration of said first nonvolatile memory is reduced.

7. A system as claimed in claim 6, wherein said exclusive read/write controller includes second write area selecting means for writing and reading, when a life of said first nonvolatile memory dependent on a number of times of writing expires, the data out of said spare area of said first nonvolatile memory.

* * * * *